Figure 1:
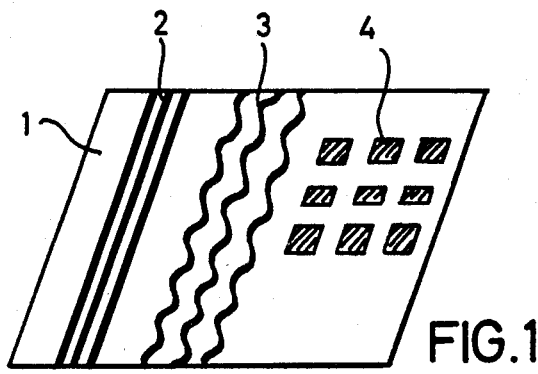

United States Patent [19]

Koester et al.

[11] 4,396,886
[45] Aug. 2, 1983

[54] DOCUMENT AUTHENTICATION BY MEANS OF EXCHANGE-ANISOTROPIC MAGNETIC MATERIAL

[75] Inventors: Eberhard Koester, Frankenthal; Joachim Hack, Ludwigshafen; Manfred Steuerwald, Frankenthal, all of Fed. Rep. of Germany

[73] Assignee: BASF Aktiengesellschaft, Ludwigshafen, Fed. Rep. of Germany

[21] Appl. No.: 212,616

[22] Filed: Dec. 3, 1980

[30] Foreign Application Priority Data

Dec. 13, 1979 [DE] Fed. Rep. of Germany ....... 2950174

[51] Int. Cl.³ .................. G01R 33/12; G06K 9/00
[52] U.S. Cl. .................. 324/212; 148/129; 235/449; 324/224; 340/825.34; 360/53
[58] Field of Search .......... 324/205, 210-212, 324/224; 340/146.3 C, 825.34; 360/25, 53, 59; 148/128, 129; 235/438, 439, 449, 493

[56] References Cited

U.S. PATENT DOCUMENTS 2,988,466 6/1961 Meiklejohn .
3,219,353 11/1965 Prentky .
3,328,195 6/1967 May .
3,566,356 2/1971 Holm et al. .
3,599,153 8/1971 Lewis et al. .
3,627,934 12/1971 Riddle ............................ 324/212 X
3,883,892 5/1975 Kneller et al. .
3,959,032 5/1976 Koester et al. .
3,961,990 6/1976 Koester et al. .
4,038,596 7/1977 Lee ................................ 324/210

FOREIGN PATENT DOCUMENTS 2405623 1/1976 Fed. Rep. of Germany .
1127043 9/1968 United Kingdom .
1331604 9/1973 United Kingdom .

*Primary Examiner*—Gerard R. Strecker
*Attorney, Agent, or Firm*—Keil & Witherspoon

[57] ABSTRACT

A process for authenticating recording media which are to be safeguarded against falsification and which possess discrete regions of an exchange-anisotropic magnetic material, by comparison of the polarity of a residual magnetization which is left over, because of the exchange anisotropy of the magnetic material, from a predetermined initial magnetization after exposure of the material to a specific temperature cycle and, subsequently, to a magnetic AC field which decreases to zero, with the polarity of a residual magnetization formed in the same way from an opposite initial magnetization, and an apparatus for carrying out the said process.

2 Claims, 5 Drawing Figures

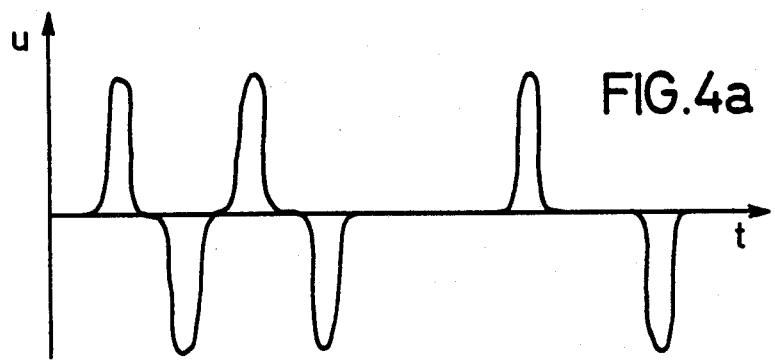
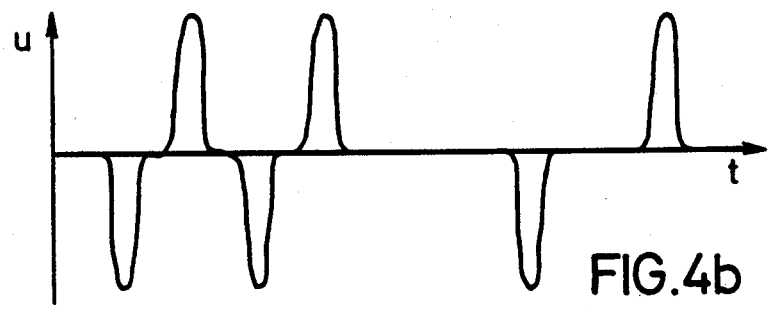

DOCUMENT AUTHENTICATION BY MEANS OF EXCHANGE-ANISOTROPIC MAGNETIC MATERIAL

This invention relates to a process for authenticating recording media which are to be safeguarded against falsification and which possess discrete regions of an exchange-anisotropic magnetic material, by comparison of the polarity of a residual magnetization which is left over, because of the exchange anisotropy of the magnetic material, from a predetermined initial magnnetization after exposure of the material to a specific temperature cycle and, subsequently, to a magnetic AC field which decreases to zero, with the polarity of a residual magnetization formed in the same way from an opposite initial magnetization, and to an apparatus for carrying out the said process.

A plurality of materials and processes for authenticating documents of various kinds, such as check cards, identity cards, banknotes and the like, or of magnetic recording media, has been proposed. Special magnetic or magnetizable materials may be employed for this purpose, either as such or in certain specific arrangements.

For example, British Pat. No. 1,127,043 discloses the incorporation of threads consisting of, or comprising, ferromagnetic material into security papers for banknotes or checks, in the actual course of manufacture of the paper. The magnetic properties of this material serve to subsequently identify the security paper. U.S. Pat. No. 3,599,153 proposes to prevent falsification in a different manner, namely by applying a mark or image consisting of magnetic ink to the document concerned, by the intaglio process, since, after saturation of the magnetic material in a constant magnetic field, a signal which varies proportionally to the varying thickness of the magnetic ink can be detected. To safeguard documents in the form of magnetic recording media, British Pat. No. 1,331,604 proposes orienting acicular magnetic particles, in selected spaced zones of a layer of such particles, fixedly in a predetermined direction, whilst the particles in the remainder of the layer are either not oriented or are oriented in a direction substantially at right angles to the firstmentioned direction. Such an arrangement is nowadays referred to as a magnetic watermark. In contrast, U.S. Pat. No. 3,566,356 discloses a security document bearing a magnetic recording, the document possessing one or more layers of a mixture of magnetizable materials having special hysteresis characteristics. The authenticity of the document is checked by comparing the sequence of recorded signals on exposure of the document to a demagnetizing field with a predetermined sequence of signals which depend on the hysteresis characteristics of the mixture of magnetic materials. Provisional data can be recorded magnetically in the material by using conventional processes. However, in such a document it is necessary to use special combinations of magnetizable materials, as has been described.

U.S. Pat. Nos. 3,219,353 and 3,328,195 disclose other multi-layer magnetic recording media which respond to different frequency ranges or in which easily erased short-term information can be recorded in one layer whilst information which is difficult to erase is recorded in the other layer. Such media can be used for security documents; their authenticity can be checked by ascertaining the presence of a predetermined information pattern, for example a code pattern, which is recorded in the layer intended for the information which is difficult to erase. However, here again the document can be falsified, using conventional recording processes, by erasing or modifying such a recorded information code pattern.

In addition to the shortcomings already described, all these processes have the further disadvantage that the ferromagnetic or ferrimagnetic materials used, even the cobalt/rare earth compounds of extremely high coercive force, are easily obtainable or have appropriate replacements. Given this situation, the desired effect, namely the safeguarding of such documents against falsification, cannot be achieved with absolute certainty.

For this reason it has also already been proposed (U.S. Pat. No. 3,883,392) to produce magnetic recording tapes employing exchange-anisotropic material which are virtually impossible to falsify.

An exchange-anisotropic magnetic material consists of a thin ferromagnetic or ferrimagnetic film to which an anti-ferromagnetic film has been applied, or consists of small ferromagnetic or ferrimagnetic particles which are coated with a thin layer of an anti-ferromagnetic material. The ferromagnetic or ferrimagnetic order vanishes above the Curie temperature $T_c$ and the anti-ferromagnetic order above the Néel temperature $T_N$. If $T_c > T_N$, the exchange-anisotropic magnetic material remembers the direction of the adjacent spins of the ferromagnetic or ferrimagnetic component if it is heated to $T_N < T_2 < T_c$, and is then again cooled to a lower temperature, for example to room temperature $T_1 < T_N < T_c$. Frequently, $T_2$ can even be slightly below $T_N$. It is true that in this case the ferromagnetic or ferrimagnetic component of the material can, at $T_1$, be magnetized any number of times in different directions by means of a strong magnetic field, but if it is exposed to an AC field which gradually decreases from high field strengths to zero, it is not demagnetized to zero, like a normal magnetic material; instead, depending on the nature of exchange-anisotropic material used, a high proportion of the original magnetization, in its original direction, is retained.

Accordingly, falsification of recordings on recording media of this type are only feasible if the magnetic material is heated to a temperature of the order of magnitude of the Néel temperature. However, to indicate that such heating has taken place, irreversible thermo-indicators are additionally required. Even though these exchange-anisotropic magnetic materials are extremely difficult to obtain, because of the special manufacturing techniques required, and even though their properties cannot be reproduced identically without an exact knowledge of the particular process employed, the above process for the safeguarding of documents agaist falsification still has the disadvantage that the magnetic materials concerned do not have very good recording properties and the available thermo-indicators are not fully satisfactory.

It is an object of the present invention to provide a process for safeguarding recording media against falsification which avoids the above disadvantages and enables, as a result of the use of magnetic materials which are difficult to obtain and to reproduce, the authenticity of the recording media to be checked, without there being any need to employ additional auxiliaries, such as indicators or other magnetic materials.

We have found that this object is achieved by a process for authenticating recording media which are to be safeguarded against falsification and which possess discrete regions of an exchange-anisotropic magnetic material whose Néel temperature $T_N$ is lower than the Curie temperature $T_c$ of the ferromagnetic of ferrimagnetic component, if these magnetizable regions of the recording medium, which are separated from one another by non-magnetic regions, are successively (a) magnetized in one direction,
(b) heated to a temperature $T_2$ which is below $T_c$ and above $T_{AFS}$, $T_{AFS}$ being below the Neel temperature $T_N$ and equal to or above the temperature at which the antiferromagnetic axis is irreversibly rotated by the existing remanent magnetization,
(c) cooled to a temperature $T_1$ which is below $T_2$, and
(d) exposed to a magnetic AC field which decreases to zero and whose strength is at least four times as great as the coercive force of the magnetic material present, and if subsequently
(e) the polarity of the residual magnetization is determined and thereafter steps (a) to (e) are repeated, the direction of magnetization in step (a) being opposite to that in step (a) above, with the proviso that the polarity of the residual magnetization is opposite that determined in step (e) above.

The apparatus according to the invention for effecting authentication comprises an arrangement of conventional means which enable the individual process steps listed above to be carried out.

Using the process and apparatus according to the invention, it is possible to clearly detect the presence of an exchange anisotropic magnetic material and hence to achieve greater protection of documents against falsification than is possible when using conventional magnetic materials.

Figure 2:
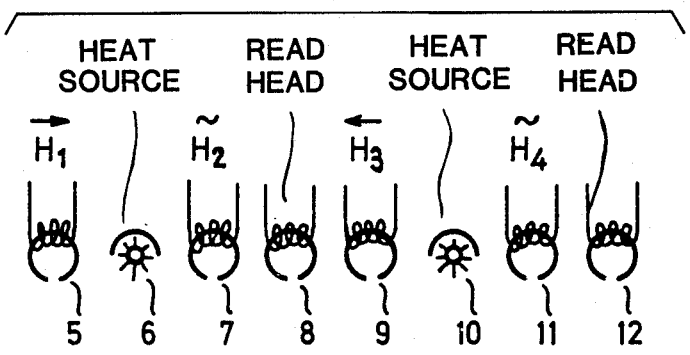
Figure 3:
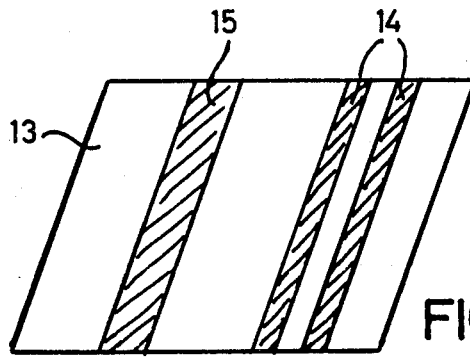

Further details of the invention are disclosed in the following description of the embodiments illustrated in the accompanying drawings, in which FIG. 1 is a plan view of a recording medium which is to be safeguarded against falsification and which is provided with various arrangements of regions of exchange-anisotropic material, FIG. 2 is a diagrammatic representation of the apparatus for carrying out the process according to the invention, FIG. 3 is a plan view of a recording medium employed in the Examples, and FIGS. 4a and 4b show graphs of the sequence of signals when carrying out the novel process according to Example 1.

FIG. 1 diagrammatically shows a document 1 which is to be safeguarded against falsification, for example a banknote, a check card or some other security paper bearing recordings in the broadest sense of the word. This document 1 bears various patterns—shown merely by way of example—of regions of exchange-anisotropic material in the form of strips or threads 2, lines 3 (which may be of any desired shape) or other areas 4, these regions being, in each case, separated from one another by non-magnetic regions.

These regions of exchange-anisotropic material are produced in a conventional manner. For example, a number of appropriate magnetic materials has been disclosed, the materials being either particulate (U.S. Pat. Nos. 2,988,466; 3,959,032; and 3,961,990) or in the form of uniform films (German Laid-Open Application DOS No. 2,405,623). The latter can be applied directly to the document to be safeguarded against falsification. However, this method is probably rarely applicable, since the process includes conditions which are not suitable for all substrates. Hence, it is advisable to employ the exchange-anisotropic material in particulate form and convert it, in a conventional manner, into inks, pastes or self-supporting tapes or sheets. For this purpose, the conventional techniques for producing magnetic printing inks or recording media may be employed.

A document provided with regions of exchange-anisotropic magnetic material is then guided, at constant speed, in the direction marked v in FIG. 2, past the authenticating apparatus comprising individual stations 5 to 12. In the course thereof, all the regions of the magnetic material are first magnetized in the same direction by the magnetic head 5 which generates a DC field of strength $H_1$ in the region of the point of contact with the exchange-anisotropic material. Thereafter, the material is heated, under the heat source 6, to a temperature $T_2$. $T_2$ must be below the Curie temperature $T_c$ of the magnetic material and above $T_{AFS}$, $T_{AFS}$ being below the Néel temperature $T_4$ and equal to or above the temperature at which the anti-ferromagnetic axis is irreversibly rotated by the existing remanent magnetization, i.e. without the action of an external magnetic field. Preferably, $T_2$, in this process step, is equal to or only slightly below $T_N$. After this heating step, the regions of exchange-anisotropic material cool to a temperature $T_1$, which is below $T_{AFS}$, usually to room temperature. This heat treatment aligns the direction of magnetization of the anti-ferromagnetic component of the magnetic material with that of the ferromagnetic or ferrimagnetic component. If, in the next step of authentication according to the invention, an AC field, of strength $H_2$, which is generated by the magnetic head 7 and slowly decreases to zero, acts on the regions of exchange-anisotropic material, a signal U can be detected by the magnetic head 8. This signal is proportional to the flux change $d\phi/dt$, which occurs at the transitions between the non-magnetic regions and the magnetic regions, since, in the case of AC field demagnetization, a large proportion of the original magnetization in the original direction is retained, the proportion depending on the nature of the exchange-anisotropic material. Thereafter, the process described is repeated, with the sign reversed. The magnetic head 9 produces a DC field of strength $H_3$, which acts on the regions of magnetic material, but in the opposite direction to the field $H_1$. As a result, the ferromagnetic or ferrimagnetic component, which has beforehand been demagnetized by the decreasing AC field $H_2$, is now magnetized in a direction which is opposite to that of the magnetization previously imparted by the magnetic head 5. After subsequently heating the material to a temperature $T_2$, by means of a heat source 10 which is the same type as heat source 6, and thereafter cooling the material, the anti-ferromagnetic component of the material is oriented in the same direction as the ferromagnetic or ferrimagnetic component, so that after demagnetization under the magnetic head 11, by means of an AC field $H_4$ which decreases to zero, there again remains the proportion of magnetization produced by the exchange-anisotropic material. This proportion is then determined by means of the read head 12, the flux change $d\phi/dt$ being now negative because the field $H_3$ acts in the opposite direction to field $H_1$. The opposite polarity of the signals reproduced by the read heads 8 and 12, which polarity can be detected by conventional circuitry, proves that a magnetic exchange-anisotropic material is present. An additional magnetic marking comprising magnetized cobalt/rare earth magnetic material ($H_C >> H_{CA}$) can be helpful as a reference for determining the polarity.

In carrying out the process according to the invention, the strength of the magnetic fields $H_1$ to $H_4$ is not very critical, as long as $H_2$ is greater than $H_1$ and $H_4$ is greater than $H_3$. Preferably, the strength of fields $H_1$ and $H_3$ are of equal magnitude and correspond to about three times the coercive force $H_{CA}$ of the exchange-anisotropic magnetic material, whilst the strengths of fields $H_2$ and $H_4$, which are also of equal magnitude, are about four times the coercive force. The fields $H_1$ and $H_3$ can be produced by conventional magnetic heads or by other arrangements such as permanent magnets or solenoids.

The heat sources 6 and 10 may be radiant heaters or heated rollers or plates. However, it is important that the regions of magnetic material reach the product temperature $T_2$. Furthermore, it may be advantageous, in carrying out the process according to the invention, to cool the magnetic regions of the documents to be authenticated, by contact with appropriate rollers or plates, upstream of each of the stations 7 and 11, which respectively generate the AC fields $H_2$ and $H_4$, so as to reach the temperature $T_1$ more rapidly.

Using the process and apparatus according to the invention, the presence of a magnetic exchange-anisotropic material can be clearly detected, and by setting the special parameters, i.e. the temperatures and the strengths of the magnetic fields, the specific material used can be identified with absolute certainty. The additional application of a code, for example in the form of a special pattern of the regions of magnetic material, or in the form of additional markings, may be advantageous but is not of prime importance in the process according to the invention.

The Examples which follow illustrate the invention. Example 2 shows, in comparison with Example 1 according to the invention, that the use of a conventional ferromagnetic or ferrimagnetic material, having a coercive force which is less than or equal to that of the exchange-anisotropic material and for which the authenticating apparatus is designed, produces no signal, and Example 3 shows that the use of a material of very high coercive force but without an anti-ferromagnetic phase gives signals of the same polarity.

EXAMPLE 1

An exchange-anisotropic magnetic material, consisting of small particles possessing a core of an alloy of 65% of Co and 35% of Ni and a surface oxide layer of 65% of CoO and 35% of NiO, is dispersed in a solution of a binder based on a partially hydrolyzed vinyl chloride/vinyl acetate copolymer, and the dispersion is applied to a polyester film and dried. The taped obtained has a remanence $M_R$ of 0.13 T, a coercive force $H_{CA}$ of 31 kA/m and a Néel temperature $T_N$ of 100° C.

Next, two strips 14, each about 1 mm wide, of the said tape are glued, 1 mm apart, onto a piece of cardboard 13 measuring 80×50 mm, and a 2 mm wide strip 15 of the tape is also glued onto the piece of cardboard, at a greater distance from the narrow strips, as shown in FIG. 3.

The resulting piece of cardboard is then passed, at a speed of 500 mm/sec, through an apparatus according to FIG. 2. The strength of field $H_1$ is 100 kA/m, $T_2$ is 110° C. and the AC field $H_2$ has, at a frequency of 60 kHz, a strength of 120 kA/m. The fields $H_3$ and $H_4$ correspond to the fields $H_1$ and $H_2$, but the direction of the field $H_3$ is opposite that of $H_1$. The signals U picked up by the read head 8 are plotted against time t in FIG. 4a, whilst FIG. 4b shows the signals U which are picked up by the down-stream read head 12. The pulses picked up by the heads 8 and 12 are of opposite polarity. The Table also shows the different states of magnetization of the magnetic material (remanence $M_R$) corresponding to the various process steps.

EXAMPLE 2

Instead of an exchange-anisotropic material, a Co-modified iron oxide power is used to produce a tape which has a coercive force $H_c$ of 30 kA/m. On passing a piece of cardboard 13 provided with strips of the resulting tape, as shown in FIG. 3, through the same apparatus as in Example 1, a signal is not obtained in either direction of the field $H_1$ (cf. the Table).

EXAMPLE 3

Instead of an exchange-anisotropic material, a barium ferrite powder is used to produce a tape which has a coercive force $H_c$ of 350 kA/m. A piece of cardboard 13 is produced with strips of this tape, as shown in FIG. 3. After magnetization in a magnetic field of 700 kA/m, the barium ferrite material has a remanence $M_R$. When the piece of cardboard 13 is passed through the apparatus according to FIG. 2, no change in the state of magnetization occurs (cf. the Table) and the polarity of the signals is not reversed; the sequence of signals shown in FIG. 4a, obtained at the read head 8, recurs at the read head 12.

If, on the other hand, the same specimen is passed unmagnetized (zero remanence) through the authenticating apparatus, no signals are picked up (cf. the Table).

TABLE

| | Example 1 | Example 2 | Example 3 |
|---|---|---|---|
| Coercive force | $H_{CA}$ | $-H_{CA}$ | $>>H_{CA}$ |
| Observed properties | $M_R$ | $M_R$ | $M_R$ |
| Initial value | 0 or $M_R$ | 0 or $M_R$ | 0 $M_R$ |
| Magnetization with $H_1$ | $M_R$ | $M_R$ | $\simeq 0\ M_R$ |
| Heating to 110° C. | $M_R$ | $M_R$ | $\simeq 0\ M_R$ |
| Demagnetization with $H_2$ | $\simeq 0.25\ M_R$ | $\simeq 0$ | $0\ M_R$ |
| Magnetization with $H_3$ | $-M_R$ | $-M_R$ | $\simeq 0\ M_R$ |
| Heating to 110° C. | $-M_R$ | $-M_R$ | $\simeq 0\ M_R$ |
| Demagnetization with $H_4$ | $\simeq -0.25\ M_R$ | $\simeq 0$ | $0\ M_R$ |

We claim:

1. A process for authenticating a recording medium which is to be safeguarded against falsification and which possesses discrete magnetizable regions of an exchange-anisotropic magnetic material whose Néel temperature $T_N$ is below the Curie temperature $T_C$ of the ferromagnetic or ferrimagnetic component, said magnetizable regions of the recording medium being separated from each other by non-magnetic regions, said process comprising the following successive steps:

(a) magnetizing said magnetizable regions in one direction, (b) heating said regions to a temperature $T_2$ which is below $T_C$ and above $T_{AFS}$, $T_{AFS}$ being below the Néel temperature $T_N$ and equal to or above the temperature at which the antiferromagnetic axis is irreversibly rotated by the existing remanent magnetization, (c) cooling said regions to a temperature $T_1$ which is below $T_2$, (d) exposing said regions to a magnetic AC field which decreases to zero and whose strength is at least 4 times as great as the coercive force of the magnetic material present, (e) determining the polarity of the residual magnetization, and thereafter repeating steps (a) to (e), the direction of magnetization in step (a) being opposite to that in step (a) above, with the proviso that the polarity of the residual magnetization is opposite that determined in step (e) above.

2. An apparatus for authethicating a recording medium which is to be safeguarded against falsification and which possesses discrete magnetizable regions of an exchange-anisotropic material whose Néel temperature $T_N$ is below the Curie temperature $T_C$ of the ferromagnetic or ferrimagnetic component, said magnetizable regions of the recording medium being separated from each other by non-magnetic regions, said apparatus comprising an arrangement for successively passing said recording medium at a constant speed through two groups of stations each including at least four individual stations in tandem, the stations of said first group including a first station having magnetic head means for exposing said magnetizable regions of said recording medium to a DC field in one direction, a second station having heating means for heating said regions to a temperature $T_2$ which is below $T_C$ and below the Néel temperature $T_N$, a third station having magnetic head means for exposing said regions, subsequent to cooling to a temperature $T_1$ below $T_2$, to a strong magnetic AC field which decreases to zero, and a fourth station having magnetic head means for determining the polarity of the residual magnetization, and said second group including at least four stations corresponding to the stations of the first group and having magnetic head means and heating means, respectively, for cooperating with said regions in a respective manner, except for the magnetization in the first station of said second group being in the direction opposite to that in the first station of the first group and the polarity of the residual magnetization determined in the fourth station of the second group being opposite to that determined in the fourth station of the first group.

* * * * *